United States Patent
Hwang

(10) Patent No.: US 9,069,391 B2
(45) Date of Patent: Jun. 30, 2015

(54) METHOD AND MEDIUM FOR INPUTTING KOREAN CHARACTERS USING A TOUCH SCREEN

(75) Inventor: Sung-Jae Hwang, Daejeon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 433 days.

(21) Appl. No.: 13/505,903

(22) PCT Filed: Nov. 4, 2010

(86) PCT No.: PCT/KR2010/007756
§ 371 (c)(1),
(2), (4) Date: May 3, 2012

(87) PCT Pub. No.: WO2011/055998
PCT Pub. Date: May 12, 2011

(65) Prior Publication Data
US 2012/0218189 A1    Aug. 30, 2012

(30) Foreign Application Priority Data

Nov. 4, 2009   (KR) .................. 10-2009-0105966
Dec. 24, 2009  (KR) .................. 10-2009-0130326

(51) Int. Cl.
*G06F 3/02*     (2006.01)
*G06F 3/023*    (2006.01)
*G06F 3/0488*   (2013.01)
*G06F 3/01*     (2006.01)
*H04M 1/23*     (2006.01)

(52) U.S. Cl.
CPC ............ *G06F 3/0233* (2013.01); *G06F 3/0488* (2013.01); *H04M 1/23* (2013.01); *H04M 2250/70* (2013.01); *G06F 3/018* (2013.01); *G06F 2203/04808* (2013.01)

(58) Field of Classification Search
CPC .............. H04M 1/23; H04M 2250/70; H04M 2250/22; G06F 2203/04808; G06F 3/018; G06F 3/0202; G06F 3/0233; G06F 3/0236; G06F 3/0237; G06F 3/0488; G06F 3/04883; G06F 3/04886; G06F 3/017; G06F 3/0238; G06F 3/0235; G06F 17/2223; G06F 3/03547; G06F 9/4448; G06K 9/00429; G06K 2209/01; G06K 9/22; G06K 9/6814; G09B 19/06; H01H 2217/036
USPC .................................. 345/168–183
See application file for complete search history.

(56) References Cited

U.S. PATENT DOCUMENTS

2004/0186729 A1 *  9/2004  Park et al. .................... 704/276
2005/0052431 A1    3/2005  Chang
(Continued)

FOREIGN PATENT DOCUMENTS

CN   1591467 A    3/2005
CN   101098533 A  1/2008
(Continued)

*Primary Examiner* — Amare Mengistu
*Assistant Examiner* — Gloryvid Figueroa-Gibson
(74) *Attorney, Agent, or Firm* — Cha & Reiter, LLC.

(57) ABSTRACT

A method for inputting a Korean character using a touch screen of a mobile device determines a vowel as a neutral vowel according to multi-touches centered around a consonant input key displayed on the touch screen. The method can minimize the number of character input keys arranged on the touch screen utilized in the mobile device, and can combine the Korean characters through the minimal touch action for inputting the Korean character.

20 Claims, 8 Drawing Sheets

(56) References Cited

U.S. PATENT DOCUMENTS

| | | | |
|---|---|---|---|
| 2007/0296707 A1 | 12/2007 | Kang et al. | |
| 2009/0066656 A1* | 3/2009 | Jung et al. | 345/171 |
| 2009/0262090 A1* | 10/2009 | Oh | 345/173 |
| 2011/0071818 A1* | 3/2011 | Jiang | 704/8 |

FOREIGN PATENT DOCUMENTS

| | | | | |
|---|---|---|---|---|
| CN | 101382869 A | 3/2009 | | |
| JP | 07-084702 A | 3/1995 | | G06F 3/03 |
| KR | 10-0159191 B1 | 2/1999 | | G06F 3/02 |
| KR | 10-1999-0052477 A | 7/1999 | | H01L 21/304 |
| KR | 10-1999-0065826 A | 8/1999 | | G06F 3/02 |
| KR | 10-2005-0102829 A | 10/2005 | | H04M 1/23 |
| KR | 10-0573298 B1 | 4/2006 | | G06F 3/02 |
| KR | 10-0821161 B1 | 4/2008 | | H04M 1/23 |
| KR | 10-2008-0097571 A | 11/2008 | | G06F 3/02 |
| KR | 10-2009-0023208 A | 3/2009 | | G06F 3/02 |
| KR | 10-2009-0076650 A | 7/2009 | | H04M 1/23 |
| WO | WO 2008-150425 A1 | 12/2008 | | G06F 3/033 |

\* cited by examiner

METHOD AND MEDIUM FOR INPUTTING KOREAN CHARACTERS USING A TOUCH SCREEN

CLAIM OF PRIORITY

The present application is a U.S. National Phase application under 35 U.S.C. §371 of International Application PCT/KR2010/007756, filed Nov. 4, 2010, which claims priority to and the benefit of the earlier filing dates of those Korean patent applications filed in the Korean Intellectual Property Office on Nov. 4, 2009 and assigned Ser. No. 10-2009-0105966, and on Dec. 24, 2009 and assigned Ser. No. 10-2009-0130326, the entire disclosure of these applications being hereby incorporated by reference.

BACKGROUND OF THE INVENTION

1. Field of the Invention

The present invention relates to a method for inputting a Korean character by using a touch screen, and a recording medium for performing the method. More particularly, the present invention relates to a Korean character input method, a recording medium, a Korean character input apparatus, and a mobile device including them, by which it is possible to greatly reduce the number of times of touching on a touch screen to input a Korean character, thereby achieving a convenient input of Korean characters and an effective use of a limited space of the touch screen.

2. Description of the Related Art

As electronic devices become compact and the touch screen emerges as a core technology, there has been a demand for a new character input method capable of replacing existing input keys.

In particular, as the Korean character requires more inputs of strokes and lines than do letters in the English alphabet, the development of a miniature character input device including a keypad designed for the easy input of a Korean letter is urgently needed.

Korean Patent Publication No. 10-1999-0065826, entitled "System For Inputting Korean Characters And Method For Inputting Korean Vowels", employs a phoneme combination method, by which it is possible to easily learn a keystroke method of the character combined with the concept of writing a phoneme, but a large number of keystrokes is disadvantageously required for the input of vowels.

Further, Korean Patent Publication No. 10-1999-0052477, entitled "Device and Method for Inputting Korean Language", implements the inputting of Korean characters according to a visual re-analysis, in which it is necessary to re-construct a consonant and then re-construct the Korean character, so that it is a system separated from a basic algorithm of inputting the Korean character. Further, it is inconvenient in that the user cannot be easily accustomed to input the characters, as well as it being necessary that the large number of keystrokes is required for the input of a consonant.

Further, Korean Patent Registration No. 159191, entitled "Apparatus For Inputting Letters In Handset And Method thereof", has disadvantages in that the number of keystrokes in the input of a consonant fails to decrease and the user has difficulty in recognizing an order of writing in the input of a geminate vowel. That is, the conventional Korean character input method has a problem in that the number of keystrokes is too large, so that the possibility of an erroneous input of the character increases, and it takes too much time for the input of the character.

SUMMARY OF THE INVENTION

Accordingly, the present invention has been made to solve the above-mentioned problems occurring in the prior art, and the present invention relates to an apparatus and a method for inputting a Korean character, which minimizes the number of character input keys arranged on a touch screen included in an electronic device, such as a mobile phone, a portable media player (PMP), and a mobile Internet device (MID), simplifies the input of a Korean character by employing a special character input method, and achieves the fast input of a Korean character.

The present invention provides a method and a recording medium for the method for inputting a Korean character by a touch screen, which can minimize the number of character input keys arranged on the touch screen, so as to greatly decrease the number of touch times, thereby achieving the simple and fast input of the Korean character.

In accordance with an aspect of the present invention, there is provided a method for inputting a Korean character by using a touch screen, the method comprising: receiving multi-touches on the touch screen; determining a vowel "ㅣ", "ㅡ", or "ㅓ" as a neutral vowel to be the inputted Korean character according to the multi-touches centered around a consonant input key displayed on the touch screen; and displaying the determined neutral vowel on the touch screen.

In accordance with another aspect of the present invention, there is provided a method for inputting a Korean character by using a touch screen, the method comprising the steps of: (a) when a length of a single dragging on the touch screen from a consonant input key displayed on the touch screen is equal to or less than a preset first length, displaying on the touch screen a vowel "ㅣ" or "ㅡ" as a neutral vowel to be the inputted Korean character; (b) when the length of the single dragging is larger than the preset first length and equal to or less than a second length, adding a single stroke to the displayed vowel "ㅣ" or "ㅡ", displaying one of "ㅏ", "ㅓ", "ㅗ", and "ㅜ" as the neutral vowel; and (c) when the length of the single dragging is larger than the second length, adding a vowel "ㅣ" to the vowel "ㅏ" or "ㅓ" displayed in step (b) and displaying "ㅐ" or "ㅔ" as the neutral vowel.

In accordance with another aspect of the present invention, there is provided a method for inputting a Korean character by using a touch screen, the method comprising the steps of: (a) when a length of a multi-dragging on the touch screen including at least two drags centered around a consonant input key displayed on the touch screen is equal to or less than a preset first length, displaying on the touch screen a vowel "ㅣ" or "ㅡ" as a neutral vowel to be the inputted Korean character; (b) when the length of the multi-dragging is larger than the preset first length and equal to or less than a second length, adding two strokes to a vowel "ㅣ" or "ㅡ" and displaying on the touch screen one of "ㅑ", "ㅕ", "ㅛ", and "ㅠ" as the neutral vowel; and (c) when the length of the multi-dragging is larger than the second length, adding a vowel "ㅣ" to the vowel "ㅑ" or "ㅕ" displayed in step (b) and displaying "ㅒ" or "ㅖ" as the neutral vowel.

In accordance with another aspect of the present invention, there is provided a non-transitory recording medium for executing a program including commands capable of executing a method for inputting a Korean character, the method comprising the steps of: receiving multi-touches on the touch screen; determining a vowel "ㅣ", "ㅡ", or "ㅓ" as a neutral vowel to be the inputted Korean character according to the multi-touches centered around a consonant input key displayed on the touch screen; and displaying the determined neutral vowel on the touch screen.

In accordance with another aspect of the present invention, there is provided an apparatus for inputting a Korean character, comprising: a touch screen for receiving multi-touches; and a controller for determining a vowel "ㅣ", "ㅡ", or "ㅓ" as a neutral vowel to be the inputted Korean character according to the multi-touches centered around a consonant input key displayed on the touch screen.

In accordance with another aspect of the present invention, there is provided an apparatus for inputting a Korean character, comprising: a touch screen for receiving multi-touches; and a controller for determining a vowel "ㅣ", "ㅡ", or "ㅓ" as a neutral vowel to be the inputted Korean character according to the multi-touches centered around a consonant input key displayed on the touch screen, wherein, when a line connecting the multi-touches vertically passes a consonant input key selected as an initial consonant, a vowel "ㅣ" is determined as the neutral vowel, and when the line connecting the multi-touches horizontally passes the consonant input key selected as an initial consonant, a vowel "ㅡ" is determined as the neutral vowel.

In accordance with another aspect of the present invention, there is provided an apparatus for inputting a Korean character, comprising: a touch screen for receiving multi-touches; and a controller for determining a vowel "ㅣ", "ㅡ", or "ㅓ" as a neutral vowel to be the inputted Korean character according to the multi-touches centered around a consonant input key displayed on the touch screen, wherein, when a line connecting the multi-touches slantingly passes a consonant input key selected as an initial consonant, a vowel "ㅓ" is determined as the neutral vowel.

In accordance with another aspect of the present invention, there is provided an apparatus for inputting a Korean character, comprising: a touch screen for receiving a single dragging; and a controller configured to: (a) when a length of a single dragging on the touch screen from a consonant input key displayed on the touch screen is equal to or less than a preset first length, display on the touch screen a vowel "ㅣ" or "ㅡ" as a neutral vowel to be the inputted Korean character; (b) when the length of the single dragging is larger than the preset first length and equal to or less than a second length, add a single stroke to the displayed vowel "ㅣ" or "ㅡ", display one of "ㅏ", "ㅓ", "ㅗ", and "ㅜ" as the neutral vowel on the touch screen; and (c) when the length of the single dragging is larger than the second length, add a vowel "ㅣ" to the vowel "ㅏ" or "ㅓ" display in step (b) and display "ㅐ" or "ㅔ" as the neutral vowel on the display screen.

In accordance with an aspect of the present invention, there is provided an apparatus for inputting a Korean character, comprising: a touch screen for receiving a single dragging; and a controller configured to: (a) when a length of a single dragging on the touch screen from a consonant input key displayed on the touch screen is equal to or less than a preset first length, display on the touch screen a vowel "ㅣ" or "ㅡ" as a neutral vowel to be the inputted Korean character; (b) when the length of the single dragging is larger than the preset first length and equal to or less than a second length, add a single stroke to the displayed vowel "ㅣ" or "ㅡ", display one of "ㅏ", "ㅓ", "ㅗ", and "ㅜ" as the neutral vowel on the touch screen; and (c) when the length of the single dragging is larger than the second length, add a vowel "ㅣ" to the vowel "ㅏ" or "ㅓ" display in step (b) and display "ㅐ" or "ㅔ" as the neutral vowel on the display screen; wherein when the dragging is in a horizontal direction, a vowel "ㅣ" is displayed as the neutral vowel, and when the dragging is in a vertical direction, a vowel "ㅡ" is displayed as the neutral vowel.

In accordance with an aspect of the present invention, there is provided an apparatus for inputting a Korean character, comprising: a touch screen for receiving a single dragging; and a controller configured to: (a) when a length of a single dragging on the touch screen from a consonant input key displayed on the touch screen is equal to or less than a preset first length, display on the touch screen a vowel "ㅣ" or "ㅡ" as a neutral vowel to be the inputted Korean character; (b) when the length of the single dragging is larger than the preset first length and equal to or less than a second length, add a single stroke to the displayed vowel "ㅣ" or "ㅡ", display one of "ㅏ", "ㅓ", "ㅗ", and "ㅜ" as the neutral vowel on the touch screen; and (c) when the length of the single dragging is larger than the second length, add a vowel "ㅣ" to the vowel "ㅏ" or "ㅓ" display in step (b) and display "ㅐ" or "ㅔ" as the neutral vowel on the display screen; wherein, when the dragging is in an upward direction, a vowel "ㅗ" is displayed as the neutral vowel in step (b), and when the dragging is in a downward direction, a vowel "ㅜ" is displayed as the neutral vowel in step (b).

In accordance with an aspect of the present invention, there is provided an apparatus for inputting a Korean character, comprising: a touch screen for receiving a single dragging; and a controller configured to: (a) when a length of a single dragging on the touch screen from a consonant input key displayed on the touch screen is equal to or less than a preset first length, display on the touch screen a vowel "ㅣ" or "ㅡ" as a neutral vowel to be the inputted Korean character; (b) when the length of the single dragging is larger than the preset first length and equal to or less than a second length, add a single stroke to the displayed vowel "ㅣ" or "ㅡ", display one of "ㅏ", "ㅓ", "ㅗ", and "ㅜ" as the neutral vowel on the touch screen; and (c) when the length of the single dragging is larger than the second length, add a vowel "ㅣ" to the vowel "ㅏ" or "ㅓ" display in step (b) and display "ㅐ" or "ㅔ" as the neutral vowel on the display screen; wherein, when the dragging is in a rightward direction, a vowel "ㅏ" is displayed as the neutral vowel in step (b), and when the dragging is in a leftward direction, a vowel "ㅓ" is displayed as the neutral vowel in step (b).

Accordingly, the present invention can minimize the number of character input keys arranged on the touch screen utilized in the mobile device, etc., and combine the Korean characters through the minimal touch action for inputting the Korean character, so that it is possible to simplify an operation for inputting the Korean character, curtail a time for inputting the Korean character, and effectively use the touch screen having a limited size. Further, according to the present invention, it is possible to input a vowel, such as "ㅣ", "ㅡ", or "ㅢ", by only one touch in a multi-touch environment and effectively input a vowel through the diversification of the dragging length.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1A:
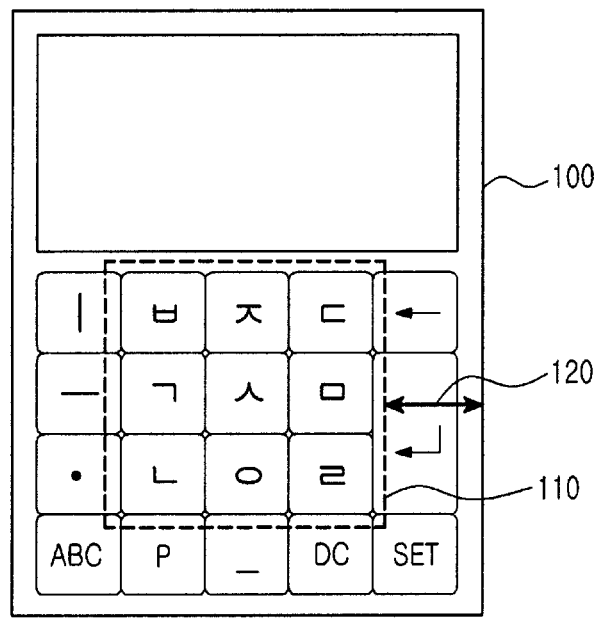
FIGS. 1a and 1b are diagrams illustrating a method for inputting a Korean character according to an exemplary embodiment of the present invention.

Hereinafter, preferred embodiments of the present invention will be described with reference to the accompanying drawings. Further, various specific definitions found in the following description are provided only to help general understanding of the present invention, and it will be understood by those skilled in the art that various changes in form and details may be made therein without departing from the spirit and scope of the invention. This invention may, however, be embodied in many different forms and should not be construed as limited to the exemplary embodiments set forth herein. The same reference numbers are used throughout the drawings to refer to the same or like parts. In the following description, a detailed explanation of known related functions and constructions may be omitted to avoid unnecessarily obscuring the subject matter of the present invention. Also, terms described herein, which are defined considering the functions of the present invention, may be implemented differently depending on user and operator's intention and practice. Therefore, the terms should be understood on the basis of the disclosure throughout the specification.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among terms set forth herein, data refers to any kind of information processed by the device, including text and/or images received from any external entities, messages transmitted or received, and information created when a specific function is executed by the device.

The present invention determines a kind of vowel according to a dragging gesture on a screen, such as a touch screen, centered around a consonant input key without a separate touch of a consonant input key corresponding to an initial sound, and combines a determined vowel with a consonant of the consonant input key. That is, the present invention has a great advantage in two aspects, in which the first advantage is that a kind of vowel can be simply determined by the number of dragging gestures and a direction of a dragging gesture, and the second advantage is that a consonant combined with the determined vowel can be automatically determined. It is understood that such keys may be implemented by icons on the touch screen and/or implemented as physical keys of the apparatus, such as a portable terminal, which includes the touch screen and physical keys.

Figure 1B:
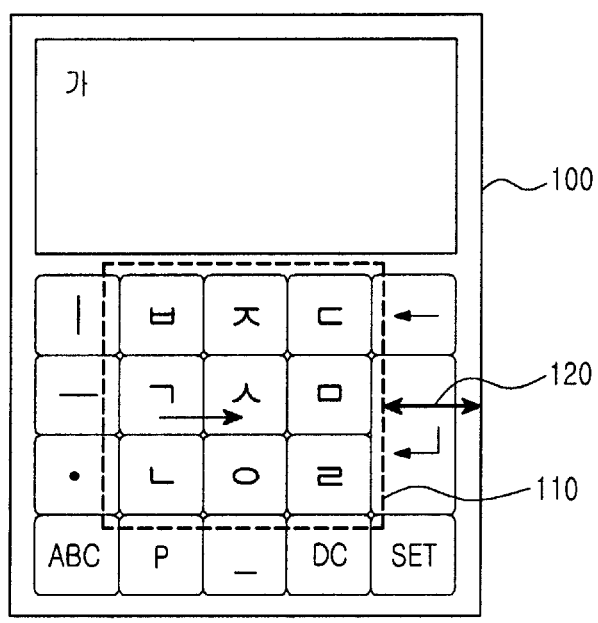

FIGS. 1a and 1b are diagrams illustrating a method for inputting a Korean character according to an exemplary embodiment of the present invention. Referring to FIG. 1a, a touch screen 100 includes an input window 110 including a plurality of consonant input keys. The plurality consonant input keys according to the exemplary embodiment of the present invention are spaced apart from a boundary of the touch screen 100 by a predetermined distance. A predetermined space 120 between the edges of the touch screen 100 and the consonant input key window 110 functions as a space in which a dragging gesture from a selected consonant input key in the input window 110 is performed. As shown in the various drawings of the present invention, the dragging gesture is represented by an arrow from one point on the screen 100 to another.

Referring to FIG. 1b, a vowel is determined by a single dragging gesture (a dragging gesture continued from the single touch) of a user initiated from a selected consonant input key. A vowel determination method will be described below.

Generally, the Korean vowel is constructed in a manner in which, based on a vowel "ㅡ", a stroke is combined in an upper side of a vowel "ㅡ" (i.e. "ㅗ") or in a lower side of a vowel "ㅡ" (i.e. "ㅜ"), or based on a vowel "ㅣ", a stroke is combined in a left side of a vowel "ㅣ" (i.e. "ㅓ") or in a right side of a vowel "ㅣ" (i.e. "ㅏ"). Therefore, an initial consonant is selected through the selection of a consonant input key in a similar manner with the method for the addition of a stroke in any of the four directions, and a vowel, "ㅏ", "ㅓ", "ㅗ", or "ㅜ", is selected according to a direction of a subsequent dragging gesture. FIG. 1b illustrates an example of inputting "가" through touching a consonant "ㄱ" and then dragging the consonant in a rightward direction. When the user drags in a downward direction, a vowel "ㅜ" including a stroke added in a lower side of a vowel "ㅡ" is selected, and when the user drags in a rightward direction, a vowel "ㅏ" is selected, and when the user drags in a leftward direction, a vowel "ㅓ" is selected.

Further, the present invention provides a novel method for inputting a geminate vowel, such as "ㅑ", "ㅕ", "ㅛ", and "ㅠ" by the aforementioned dragging gesture.

Figure 2:
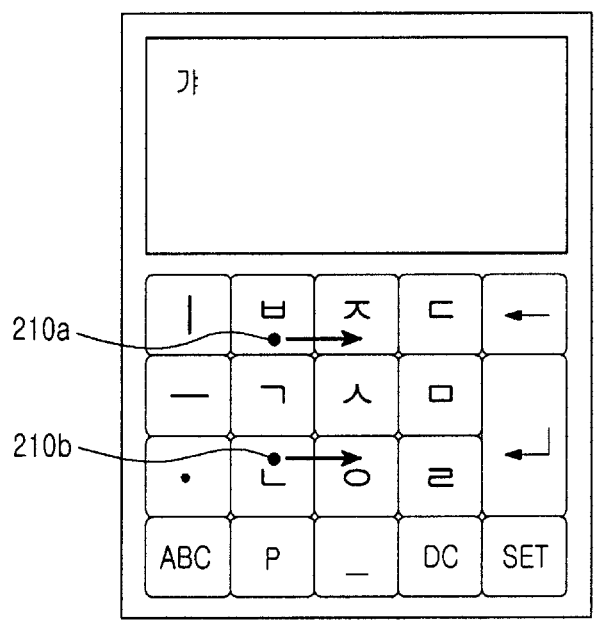
FIG. 2 is a diagram illustrating a method for inputting a geminate vowel according to the exemplary embodiment of the present invention.

FIG. 2 is a diagram illustrating a method for inputting a geminate vowel according to the exemplary embodiment of the present invention.

Referring to FIG. 2, the user touches multiple points including two points 210a and 210b centered around a desired initial consonant input key "ㄱ" among the plurality of consonant input keys. The "touch" as used herein refers to not only physical contact, but also a gesture of an input means, such as a finger or a stylus pen, coming substantially close to a physical point or location, in which the touch can be detected by a touch detector of the touch screen.

The present invention addresses the problem in the prior art in that the sizes of many Korean character input keys become inevitably small to be suitable for a compact electronic device, such as a mobile device, so that the user has an actual difficulty in touching the small consonant input keys with two fingers. To solve this problem, the present invention provides a method for inputting a Korean character, in which the user touches two points separated from a desired consonant input key by a predetermined distance without touching the desired consonant input key with two fingers, and simultaneously drags from the two points for inputting the geminate vowel, such as "ㅑ", "ㅛ", "ㅠ", or "ㅕ".

The direction of adding the stroke is the same as that of the single vowel. When the user upward drags, "ㅛ" is selected, when the user downward drags, "ㅠ" is selected, when the user rightward drags, "ㅑ" is selected, and when the user leftward drags, "ㅕ" is selected.

In the present invention, a method for selecting a consonant combined with a geminate vowel is different from that combined with a simple vowel. In the event of the simple vowel (i.e. one dragging gesture), the consonant input key from which the dragging gesture starts corresponds to the initial consonant as described above. However, in the event of the geminate vowel requiring at least two simultaneous touches, it is difficult to touch and subsequently drag in the small consonant input keys. Therefore, according to the present invention, the user touches two points separated from the desired consonant input key by a predetermined distance and selects a consonant input key corresponding to the center point of the two points (i.e. the consonant input key closest to the two points) as an initial consonant. In this case, even in the event that the user touches another consonant input key, instead of the desired initial consonant input key, when the two touch points are detected, the other touched consonant input keys (e.g. "ㅂ", "ㄴ") are not selected as the initial consonant, but the consonant input key "ㄱ" located at a center of the other touched consonant input keys is selected as the initial consonant.

The method according to the present invention is greatly effective for the input of the geminate vowel by a multi-touch action in a small touch screen environment, such as a portable terminal Further, through the method according to the present invention, it is possible to actually input the geminate vowel by one touch-and-drag action similar to the method of inputting the single vowel.

Further, the present invention further includes a separate input key on the input window of the touch screen, in which the separate input key selectively converts the consonant input keys on the input window, which maximizes the space utility and only includes the Korean consonant input keys, to input keys for the double consonants and the plosives. In an aspect of the maximization of the useful space of the touch screen, it is preferred that the separate input key, for selectively converting the consonant input keys to the input keys of the double consonants and the plosives, is included in a region between the consonant input key and the boundary of the touch screen. An input key 'P' is for the plosives, and an input key 'DC' is for the double consonants.

Figure 3:
FIG. 3 is a diagram illustrating a case in which a user converts a consonant input key to a double consonant input key of a Korean character according to the exemplary embodiment of the present invention.
Figure 4:
FIG. 4 is a diagram illustrating a case in which a user converts a consonant input key to a plosive input key of a Korean character according to the exemplary embodiment of the present invention.

FIG. 3 is a diagram illustrating a case in which a user converts the consonant input key to the double consonants input key of the Korean character, and FIG. 4 is a diagram illustrating a case in which user converts the consonant input key to the plosive input key of the Korean character.

The present invention provides various recording media, as described herein, for executing a program including commands for executing the method for inputting the Korean character of the present invention. The recording medium can be implemented with various forms, such as a floppy disk, a compact disk (CD), a Universal Serial Bus (USB) device, and a hard disk.

Further, the present invention provides an apparatus for inputting a Korean character for executing the method for inputting the Korean character.

Figure 5:
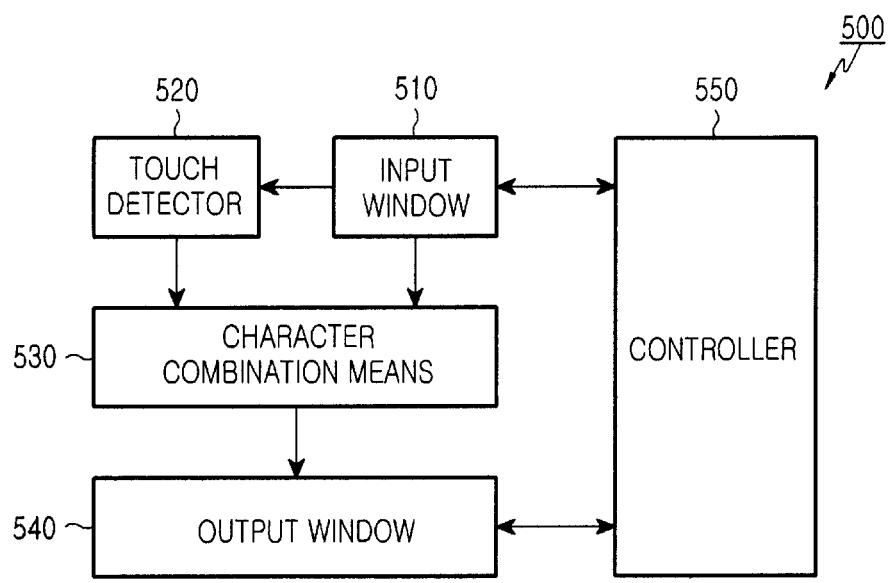
FIG. 5 is a block diagram illustrating an apparatus for inputting a Korean character according to the exemplary embodiment of the present invention.

FIG. 5 is a block diagram illustrating the apparatus for inputting a Korean character according to the exemplary embodiment of the present invention.

Referring to FIG. 5, the apparatus 500 for inputting the Korean character according to the exemplary embodiment of the present invention includes an input window 510 including consonant input keys on a touch screen 100, such as the input window 110 in FIGS. 1a-1c, as well as a touch detector 520 for detecting a touch on the touch screen 100, a character combination means 530 for selecting any one vowel among "ㅓ", "ㅏ", "ㅗ", and "ㅜ" according to a single point drag direction initiated from the consonant input key on the input window 510 or selecting any one vowel of "ㅕ", "ㅑ", "ㅛ", and "ㅠ" according to the multi-dragging gestures performed with at least two points separated from the consonant input key by a predetermined distance, and combining the selected vowel with the consonant of the consonant input key; an output window 540 for outputting and displaying the combined Korean character, for example, as shown in the upper portion of the touch screen 100 in FIGS. 1a-1c; and a controller 550 for controlling the touch input on the input window 510 and the output of the combined Korean character on the output window 540. The components 510-550 are operatively connected to each other by wired and/or wireless connections; for example, mounted on a common motherboard and connected to a power supply and a communication bus within the apparatus 500.

The character combination means 530 according to the present invention determines a single vowel or a geminate vowel according to the number of drag gestures (i.e. the number of simultaneously performed dragging gestures) detected from the touch detector 520, and determines a position of a stroke added according to the direction of the dragging gesture. The method for determining the single vowel and the geminate vowel and the method of the stroke addition have been described with reference to FIGS. 1a, 1b, and 2, so that repeated descriptions of the methods will be omitted.

The character combination means 530 of the apparatus 500 for inputting the Korean character according to the exemplary embodiment of the present invention includes a general computing apparatus for combining the characters in a preset method based on the detected touch input and dragging gesture, and can include a central processing unit and a memory device.

Further, the character combination means 530 may be a central processing unit of a mobile device including the apparatus for inputting the Korean character.

The multi-point dragging gesture for determining the geminate vowel refers to a dragging gesture starting from two symmetrical points separated from the consonant input key, which is selected as the initial consonant, by a predetermined distance. With regard to this, the initial consonant corresponds to the consonant input key at the center point between the two touch points, not the actual touch point. Therefore, when the multi-point dragging gesture is detected, the character combination means 530 selects the consonant input key closest to the points, from which the multi-point dragging gesture starts, as the initial consonant, which is previously described. According to an alternative exemplary embodiment of the present invention, the plurality of consonant input keys are separated from the boundary of the touch screen 100 by a predetermined distance, and the dragging with respect to the consonant input key is performed in the separated space. Further, the apparatus can further include a separate input key for converting the plurality of consonant input keys to the double consonants input keys and the plosive input keys in the separated space.

According to a further alternative exemplary embodiment of the present invention, the present invention provides a method for inputting a Korean character, which determines a single vowel or a geminate vowel according to the number of touch times, determines a kind of vowel according to a dragging direction and selects a complex vowel according to a dragging length at the same time.

FIGS. 6a to 6d are diagrams illustrating a method for inputting the Korean character according to the alternative exemplary embodiment of the present invention.

Figure 6A:
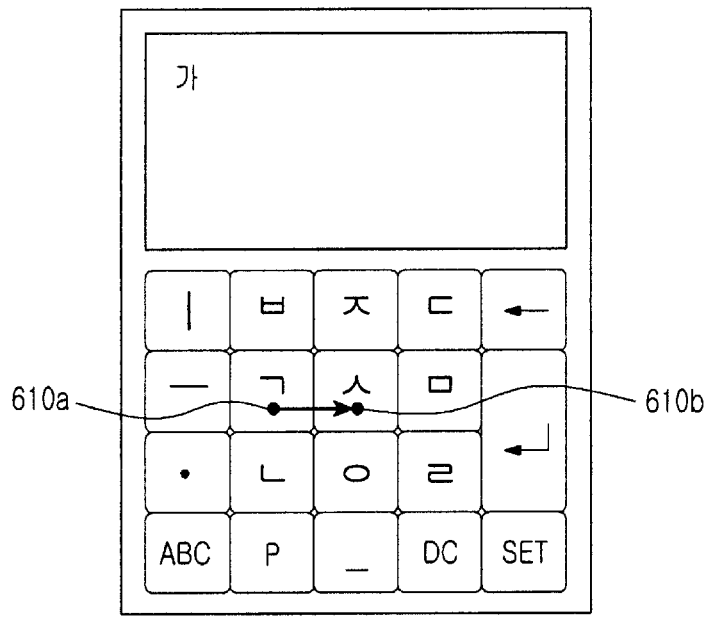
FIGS. 6a to 6d are diagrams illustrating a method for inputting a Korean character according to an alternative exemplary embodiment of the present invention.

Referring to FIG. 6a, the user touches a point 610a of the consonant input key "ㄱ" among the consonant input keys and drags to another point 610b separated from the point 610a by a predetermined distance. At this time, the number of dragging gestures is one, and the dragging is performed in a rightward direction, so that the initially input consonant "ㄱ" is combined with a vowel "ㅏ" and "가" is displayed on the output window 540, which may be implemented in the upper portion of the touch screen 100 shown in, for example, FIGS. 1a-1d and FIG. 6a. Such a vowel input method has been previously described.

Figure 6B:
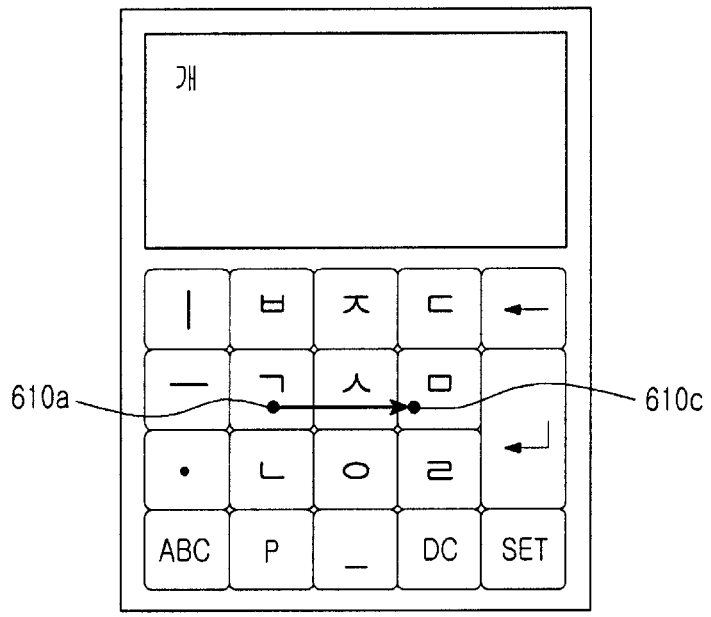

Referring to FIG. 6b, the user touches the point 610a of the consonant input key "ㄱ" and then drags to another point 610c in a rightward direction. At this time, the length of the dragging gesture is longer than that indicated in FIG. 6a. That is, the user drags to another point 610c further separated in a rightward direction than the point 610b. Therefore, the vowel "ㅣ" is added to the vowel "ㅏ" indicated in FIG. 6a, so that the complex vowel "ㅐ" is selected. The selected complex vowel "ㅐ" is combined with the preselected consonant "ㄱ", so that the Korean syllable "개" is output.

That is, according to the alternative exemplary embodiment of the present invention, the kind of vowel is determined according to the length of the dragging gesture, as well as the number of dragging gestures and the dragging direction. In particular, the length of the dragging gesture determines a complex vowel in which a single vowel or a geminate vowel is combined with a vowel "ㅣ"or "ㅡ". A predetermined length of the dragging gesture determining the complex vowel can be pre-set, or alternatively set by the user. For example, a single vowel or a geminate vowel can be selected by a dragging gesture to the adjacent consonant input key, and a complex vowel can be selected by a dragging gesture to a separated consonant input key.

Figure 6C:
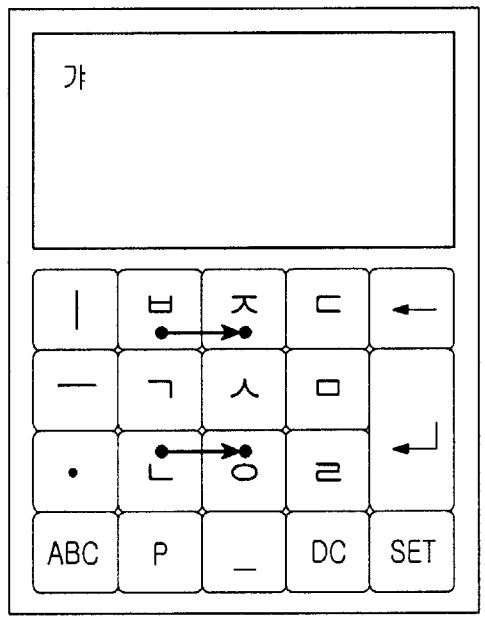
Figure 6D:
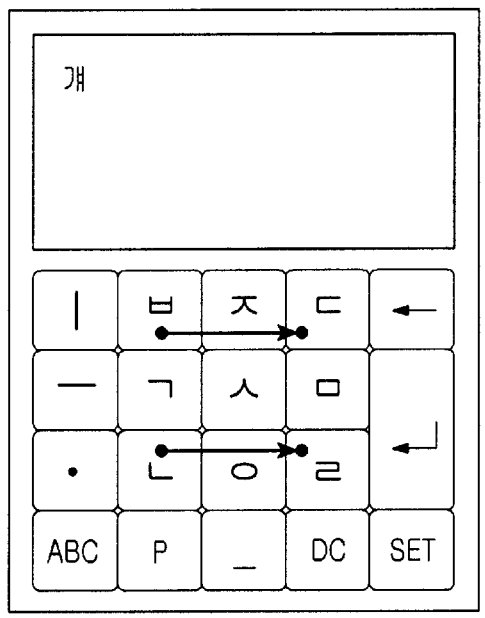

FIGS. 6c to 6d illustrate cases for selectively inputting "가" and "개" according to the number of dragging gestures and the length of the dragging gesture, respectively. Herein, as shown in the various drawings of the present invention, such as FIG. 6c, an arrow indicates the dragging gesture.

Referring to FIGS. 6c to 6d, a geminate vowel is determined according to a dragging gesture from two points (i.e. two dragging gestures) separated with respect to the consonant input key "ㄱ" and the vowel "ㅣ" is added according to the extension of the length of the dragging gesture. Further, a consonant corresponding to a point closest to the two points from which the two dragging gestures start (i.e. a consonant corresponding to a center between the two points) is selected as an initial consonant, which has been previously described.

Alternatively, it is possible to select the vowel "ㅣ" or "ㅡ" according to the length of the dragging gesture performed at a point separated from the single consonant input key. For example, when the user continuously drags at least two input keys from a right side of the input key "ㄱ" (e.g. ㅂ → ㅅ → ㅇ), the continuous dragging gesture is determined as the dragging gesture for inputting the vowel "ㅣ" with respect to the consonant "ㄱ", rather than the dragging gesture for inputting the single consonant, so that the vowel "ㅣ" is combined with the consonant "ㄱ", to output "기".

The apparatus and the method for inputting the Korean character according to the present invention can be implemented using a touch screen of any electronic device supporting and processing gestures on such a touch screen, e.g. a mobile device, a PMP, and a notebook computer.

According to another alternative exemplary embodiment of the present invention, the present invention provides a method for inputting the Korean character, which selects "ㅣ", "ㅡ", or "ㅢ" as a neutral vowel by a touch gesture, not by a touch dragging gesture.

Figure 7A:
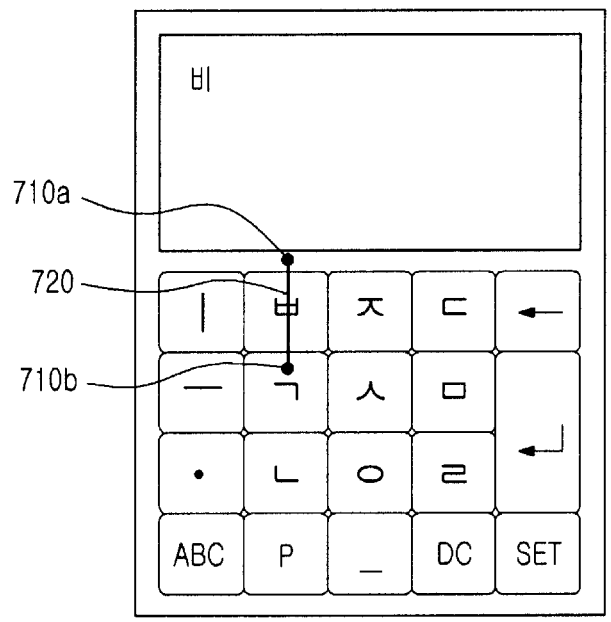
FIGS. 7a to 7c are diagrams illustrating a method for inputting the Korean vowels "ㅣ", "ㅡ", and "ㅢ" according to the exemplary embodiment of the present invention.
Figure 7B:
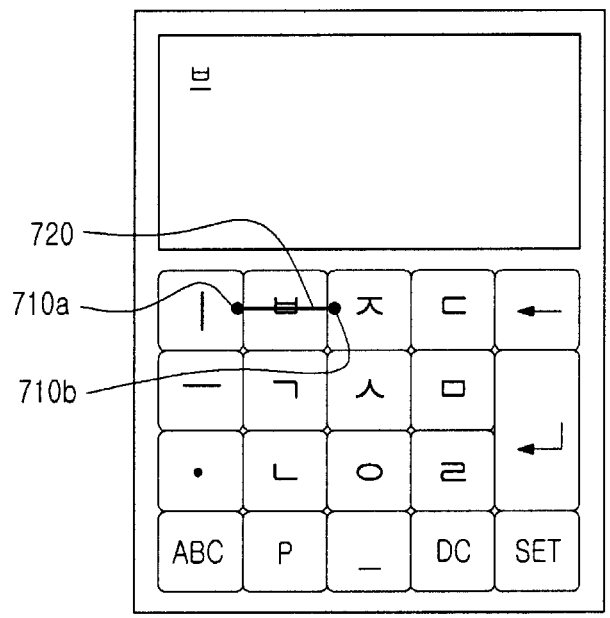
Figure 7C:
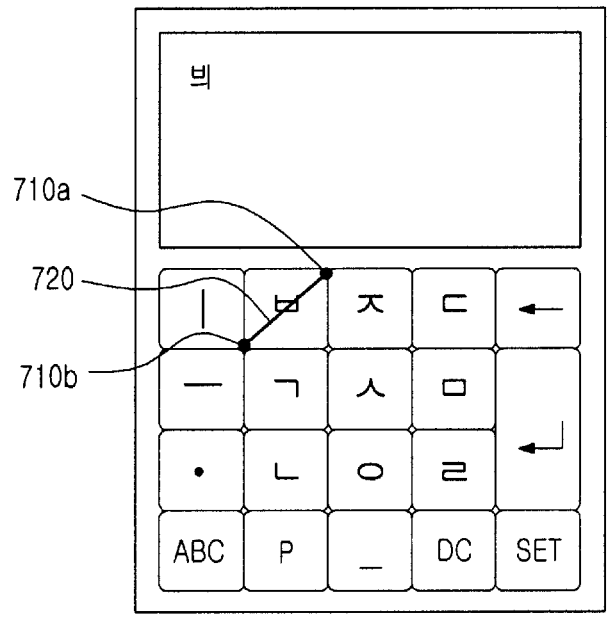

FIGS. 7a to 7c are diagrams illustrating a method for inputting the Korean vowel "ㅣ", "ㅡ", or "ㅢ" according to the exemplary embodiment of the present invention.

Referring to FIG. 7a, when the user touches two points 710a and 710b in a lower side and an upper side of the consonant input key of a desired initial sound "ㅂ" at the same time, a central processing unit of the apparatus including the touch screen 100 calculates a line 720 connecting the two points 710a and 710b. When the connected line 720 is a vertical line (i.e. in a shape similar to the vowel "ㅣ"), the vowel "ㅣ" is selected. At this time, the initial consonant is the consonant corresponding to the consonant input key located at an actual center between the two touch points 710a and 710b.

Referring to FIG. 7b, when the user touches two points 710a and 710b in a left side and a right side, respectively, of the input key of a desired initial sound "ㅂ" at the same time, a central processing unit of the apparatus including the touch screen 100 calculates a line 720 connecting the two points 710a and 710b. When the connected line 720 is a horizontal line (i.e. in a shape similar to the vowel "—"), the vowel "—" is selected. At this time, the initial consonant is the consonant corresponding to the consonant input key located at an actual center between the two touch points 710a and 710b.

Referring to FIG. 7c, the user touches a point 710a of a left-lower side and a point 710b in a right-upper side of a desired initial consonant input key "ㅂ". In this case, the connected line 720 between the two points 710a and 710b slantingly passes the desired initial consonant "ㅂ" and then the initial consonant "ㅂ" is determined as the initial consonant. Further, the vowel "ㅓ" having a line horizontally extending between the two points 710a and 710b and a line vertically extending between the two points 710a and 710b is selected as a neutral vowel.

According to a further alternative exemplary embodiment of the present invention, the present invention provides a method for inputting a Korean character, which divides the dragging from the consonant input key into multiple stages, and which changes the vowel for each stage according to a predetermined method, such as a mapping of gestures with Korean characters, or a table of gestures and corresponding Korean characters which is stored in a memory, in a manner known in the art. According to the method, it is possible to input the vowel "ㅣ" or "—" by one touch and sequential dragging.

Figure 8A:
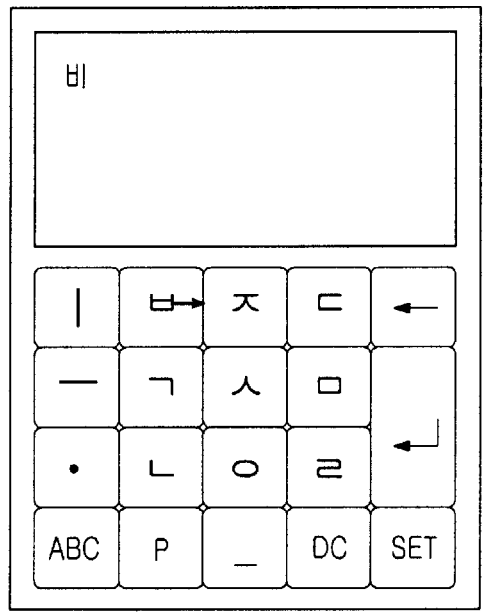
FIGS. 8a to 8c are diagrams illustrating a method for inputting Korean characters "ㅔ", "ㅐ", and "ㅒ" according to the exemplary embodiment of the present invention.
Figure 8B:
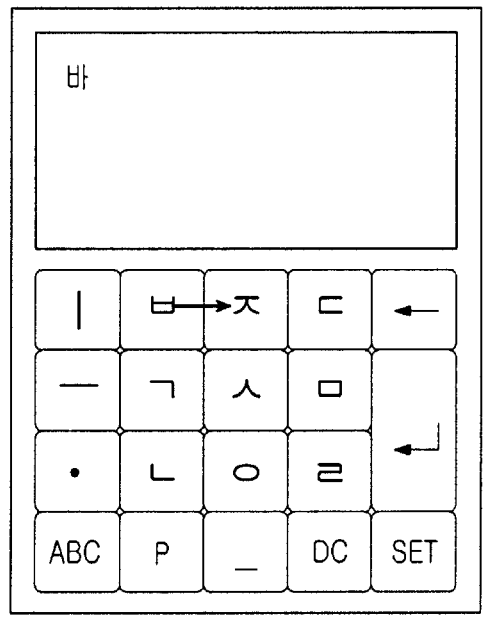
Figure 8C:
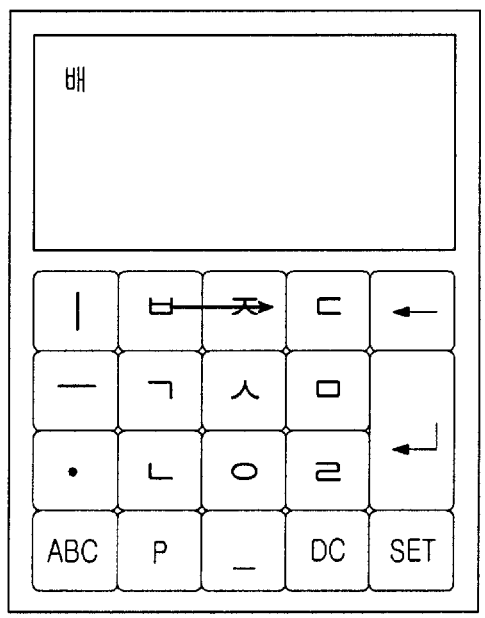

FIGS. 8a to 8c are diagrams illustrating a method for inputting the Korean characters "비", "바", and "배" according to the exemplary embodiment of the present invention.

Referring to FIG. 8a, when the user touches the desired initial consonant input key "ㅐ" and horizontally drags in a rightward direction, as shown by the arrow for a length within a predetermined first length range, the vowel "ㅣ" is selected according to the user's dragging.

Referring to FIG. 8b, when the user touches the desired initial consonant and drags in a rightward direction, as shown by the arrow for a length within a predetermined second length range (i.e. the length longer than the first length and equal to or shorter than the second length), a stroke is added to the vowel "ㅣ" indicated in FIG. 8a, so that the neutral vowel "ㅏ" is displayed. The location of the stroke addition is determined according to the dragging direction as described above. When the dragging is performed in a leftward direction, the vowel "ㅓ" is displayed as the neutral vowel. Then, when the user extends the dragging in a length within a predetermined third length range (i.e. the length larger than the second length), the vowel "ㅣ" is added to the vowel "ㅏ" indicated in FIG. 8b, so that the vowel "ㅐ" or "ㅔ" is displayed as shown in FIG. 8c.

According to an additional alternative exemplary embodiment of the present invention, the vowel "—" is displayed according to the vertical dragging (in the upward or downward direction) for a length shorter than the predetermined length as the neutral vowel, and the vowel "ㅗ" or "ㅜ" according to the vertical dragging for a length longer than the predetermined length as the neutral vowel. This method can be appreciated by those skilled in the art from the description herein with reference to FIGS. 8a and 8b, which also belongs to the scope of the present invention.

Further, in the event of the user performing multi-touches including at least two touches, when the length of the dragging is less than the first length, the vowel "ㅣ" or "—" is simply displayed; when the length of the dragging is larger than the first length and equal to or less than the second length, the dominate vowel "ㅏ", "ㅓ", "ㅗ", and "ㅜ" is displayed; and when the length of the dragging is larger than the second length, the vowel "ㅣ" is added to the vowel "ㅏ" or "ㅓ", so that the vowel "ㅐ" or "ㅔ" is displayed.

The above-described apparatus and methods according to the present invention can be implemented in hardware, firmware or as software or computer code that can be stored in a recording medium such as a CD ROM, a RAM, a ROM, a floppy disk, DVDs, a hard disk, a magnetic storage media, magnetic tape, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the present invention also includes an implementation in a form of a carrier wave (e.g. the transmission through Internet). Further, the computer readable recording medium can store and execute a code that is distributed in a computer system connected with a network and readable by a computer in a distribution method.

The foregoing is merely an exemplary embodiment of the technical spirit of the present invention and it will be readily understood by those skilled in the art that various modifications and changes can be made thereto within the technical spirit and scope of the present invention. The protection scope of the present invention shall be interpreted by the appended claims and every technical spirit within its equivalent scope shall be understood to be included in the claims of the present invention.

What is claimed is:

1. A method for inputting a character by using a touch screen, the method comprising:
   detecting a first touch at a first location in the touch screen and a second touch at a second location in the touch screen;
   selecting a vowel based on an orientation of a line connecting the first location and the second location across a consonant key; and
   in response to the first touch and the second touch, displaying the vowel and a consonant corresponding to the consonant key.

2. The method as claimed in claim 1, wherein when the line connecting the first location and the second location vertically passes the consonant key, "ㅣ" is selected as the vowel, and when the line horizontally passes the consonant key, "ㅡ" is selected as the vowel.

3. The method as claimed in claim 1, wherein when the line connecting the first location and the second location slantingly passes the consonant key, "ㅓ" is selected as the vowel.

4. A method for inputting a Korean character by using a touch screen, the method comprising the steps of:
   displaying on the touch screen a vowel that is selected based on a length of a dragging gesture, such that a count of strokes in the vowel is proportional to the length of the dragging gesture, wherein:
   (a) when the length of the dragging gesture is equal to or less than a preset first length, one of "ㅣ" or "ㅡ" is displayed;
   (b) when the length of the dragging gesture is larger than the preset first length and equal to or less than a second length, one of "ㅏ", "ㅓ", "ㅗ", and "ㅜ" is displayed; and
   (c) when the length of the dragging gesture is larger than the second length, one of "ㅐ" or "ㅔ" is displayed.

5. The method as claimed in claim 4, wherein:
   when the length of the dragging is equal to or less than the preset first length and the dragging gesture is performed in a horizontal direction "ㅣ" is displayed, and
   when the length of the dragging is equal to or less than the preset first length and the dragging gesture is performed in a vertical direction, "ㅡ" is displayed.

6. The method as claimed in claim 5, wherein:
   when the length of the dragging gesture is larger than the preset first length and equal to or less than the second length, and the dragging gesture is performed in an upward direction, "ㅗ" is displayed, and
   when the length of the dragging gesture is larger than the preset first length and equal to or less than the second length, and the dragging gesture is performed in a downward direction, "ㅜ" is displayed.

7. The method as claimed in claim 5, wherein:
   when the length of the dragging gesture is larger than the preset first length and equal to or less than the second length, and the dragging is in a rightward direction, "ㅏ" is displayed as , and
   when the length of the dragging gesture is larger than the preset first length and equal to or less than the second length, and the dragging is in a leftward direction, "ㅓ" is displayed.

8. A method for inputting a Korean character by using a touch screen, the method comprising the steps of:
   detecting a multi-dragging gesture, the multi-dragging gesture including a first dragging gesture and a second dragging gesture performed on different sides of a consonant input key that is displayed on the touch screen;
   (a) when a length of the multi-dragging gesture is equal to or less than a preset first length, displaying on the touch screen one of "ㅣ" or "ㅡ";
   (b) when the length of the multi-dragging gesture is larger than the preset first length and equal to or less than a second length, displaying, on the touch screen, one of "ㅏ", "ㅓ", "ㅗ", and "ㅜ"; and
   (c) when the length of the multi-dragging gesture is larger than the second length, displaying on the touch screen one of "ㅐ" or "ㅔ".

9. The method as claimed in claim 8, wherein when the multi-dragging gesture is performed in a horizontal direction, "ㅣ" is displayed, and when the multi-dragging gesture is performed in a vertical direction, "ㅡ" is displayed.

10. The method as claimed in claim 9, wherein when the multi-dragging gesture is performed in an upward direction, a vowel "ㅗ" is displayed, and when the multi-dragging gesture is performed in a downward direction, "ㅜ" is displayed.

11. The method as claimed in claim 9, wherein when the multi-dragging gesture is performed in a rightward direction, a vowel "ㅏ" is displayed, and when the multi-dragging gesture is performed in a leftward direction, "ㅓ" is displayed.

12. The method as claimed in claim 8, wherein the multi-dragging gesture starts from a point separated by a predetermined distance from the consonant input key.

13. A non-transitory recording medium for executing a program including commands capable of executing a method for inputting a Korean character, the method comprising the steps of:
   detecting a first touch at a first location in a touch screen and a second touch at a second location in the touch screen;
   selecting a vowel based on an orientation of a line connecting the first location and the second location across a consonant key; and
   in response to the first touch and the second touch, displaying the vowel and a consonant corresponding to the consonant key.

14. An apparatus comprising a touch screen and a controller, the controller being configured to:
   detect a first touch at a first location in the touch screen and a second touch at a second location in the touch screen;
   select a vowel based on an orientation of a line connecting the first location and the second location across to a consonant key; and
   in response to the first touch and the second touch, display the vowel and a consonant corresponding to the consonant key;
   wherein the first touch and the second touch are performed outside of the consonant key.

15. The apparatus of claim 14, wherein when the line connecting the first location and the second location vertically passes the consonant key, "ㅣ" is selected as the vowel, and when the line horizontally passes the consonant key, "ㅡ" is selected as the vowel.

16. The apparatus of claim 14, wherein when the line connecting the first location and the second location slantingly passes the consonant key, "ㅓ" is selected as the vowel.

17. An apparatus comprising a touch screen and a controller, the controller being configured to:
  display on the touch screen a vowel that is selected based on a length of a dragging gesture, such that a count of strokes in the vowel is proportional to the length of the dragging gesture, wherein:
  (a) when the length of the dragging gesture is equal to or less than a preset first length, one of "ㅣ" or "—" is displayed;
  (b) when the length of the dragging gesture is larger than the preset first length and equal to or less than a second length, one of "ㅏ", "ㅓ", "ㅗ", and "ㅜ" is displayed; and
  (c) when the length of the dragging gesture is larger than the second length, one of "ㅐ" or "ㅔ" is displayed.

18. The apparatus of claim 17, wherein:
  when the length of the dragging is equal to or less than the preset first length and the dragging gesture is performed in a horizontal direction "ㅣ" is displayed, and
  when the length of the dragging is equal to or less than the preset first length and the dragging gesture is performed in a vertical direction, "—" is displayed.

19. The apparatus of claim 17, wherein:
  when the length of the dragging gesture is larger than the preset first length and equal to or less than the second length, and the dragging gesture is performed in an upward direction, "ㅗ" is displayed, and
  when the length of the dragging gesture is larger than the preset first length and equal to or less than the second length, and the dragging gesture is performed in a downward direction, "ㅜ" is displayed.

20. The apparatus of claim 17, wherein:
  when the length of the dragging gesture is larger than the preset first length and equal to or less than the second length, and the dragging is in a rightward direction, "ㅏ" is displayed as, and
  when the length of the dragging gesture is larger than the preset first length and equal to or less than the second length, and the dragging is in a leftward direction, "ㅓ" is displayed.

\* \* \* \* \*